United States Patent [19]
Itoh

[11] 3,911,232
[45] Oct. 7, 1975

[54] DEMODULATION SYSTEM FOR ANGLE-MODULATED WAVE PICKED UP FROM A MULTI-CHANNEL RECORD DISC

[75] Inventor: Yasuo Itoh, Tokyo, Japan

[73] Assignee: Victor Company of Japan, Ltd., Yokohama, Japan

[22] Filed: Dec. 28, 1973

[21] Appl. No.: 429,114

[30] Foreign Application Priority Data

Dec. 29, 1972 Japan .................................. 48-1541

[52] U.S. Cl.. 179/100.4 ST; 179/1 GQ; 179/15 BT; 179/100.1 TD; 329/122

[51] Int. Cl.² ....................... G11B 3/74; H03D 3/00

[58] Field of Search ..179/100.4 A, 100.4 C, 100.4 M, 179/100.4 ST, 100.1 TD, 1 GQ, 15 BT; 329/122

[56] References Cited

UNITED STATES PATENTS 3,564,434 2/1971 Camenzind et al. ................ 329/122

3,686,471 8/1972 Takahashi ................. 179/100.4 ST

*Primary Examiner*—Bernard Konick
*Assistant Examiner*—Stewart Levy

[57] ABSTRACT

A demodulation system comprises a phase-locked loop for demodulating an angle-modulated wave picked up from a multi-channel record disc. A circuit reduces the loop gain of the phase-locked loop to reduce the lock range width of the loop. The lock range falls within the bandwidth of the angle-modulated wave and prevents the occurrence of erroneous locking responsive to the harmonic components of a direct wave. An amplification circuit compensates for a frequency characteristic on the high frequency side of a signal demodulated by the phase-locked loop.

7 Claims, 8 Drawing Figures

DEMODULATION SYSTEM FOR ANGLE-MODULATED WAVE PICKED UP FROM A MULTI-CHANNEL RECORD DISC

BACKGROUND OF THE INVENTION

The present invention relates to a demodulation system for an angle-modulated wave picked up from a multi-channel record disc and more particularly to a demodulation system for an angle-modulated wave which is multiplexed on a direct wave picked up from a discrete multi-channel record disc. The invention prevents an erroneous locking responsive to the use of a phaselocked loop.

A discrete four-channel record disc system was previously disclosed and patented in the United States as U.S. Pat. No. 3,686,471. There, a direct wave of the sum signal of a pair of two channels and an angle-modulated wave obtained by angle modulating a 30 KHz carrier wave by the difference signal of a pair of two channels are superimposed and recorded on the opposite side walls of the disc sound groove.

In picking up and reproducing a signal recorded on this multi-channel record, a need arises for taking out the angle-modulated difference signal from among the picked up signals. It must be separated from the direct-wave sum signal in order to demodulate the angle-modulated difference signal. It is to be understood here that the direct-wave sum signal has a frequency band ranging from 0 to 15 KHz. The angle-modulated difference signal has a frequency band ranging from 20 KHz to 45 KHz.

When recording on a disc with a cutting stylus, or tracing a sound groove with a pick-up stylus, it is generally inevitable that cutting or tracing distortion occurs. Because of these kinds of distortions, harmonic waves of the direct-wave signal are produced. The harmonic components are present in the vicinity of the frequency band of the angle-modulated wave.

Ideally, only the angle-modulated signal component should be extracted and it should contain no harmonic components of the direct-wave signal. The filtering characteristic of a bandpass filter for passing the angle-modulated wave signal must be made sufficiently steep in order to extract this component. Such a filter, having such a steep characteristic, is invariably expensive. Moreover, if the filtering characteristic of such a band-pass filter is made steep, the group delay characteristic deteriorates, resulting in distortion. For this reason, it is practically impossible to rely on only the filter in order to eliminate the deleterious effect of the harmonic components.

It is a common practice to record at a high level recording for raising the level of the angle-modulated wave, which is generally of low level. The discrete multi-channel record disc attains a reproduction compatible with the conventional two-channel stereophonic record disc. Accordingly, the high recording level of the direct wave raises the level of the harmonic components of the direct wave, in the vicinity of the frequency band of the angle-modulated wave. From this viewpoint too, the existence of the harmonic components cannot be disregarded.

The harmonic components of the direct wave are unrelated to the wear in record discs. Hence, the problem of the harmonic waves is serious from the initial use of the disc. The deleterious effect of the harmonic components is rather predominant at the beginning of the use of the disc because the overall reproducing level is high during this period, whereby the problem of the harmonics becomes more serious.

The present applicant has previously described a novel demodulation system in a co-pending U.S. Patent application Ser. No. 403,635, filed Oct. 4, 1973, entitled "Angle Modulated Wave Demodulation System." There, a new demodulation system demodulates without the occurrence of abnormal phenomena due to the harmonic components of the direct wave, by employing a phase-locked loop (hereinafter abbreviated as PLL).

According to this system, a limiter in the PLL restricts the control voltage for a voltage-controlled oscillator. This restriction prevents the lower limit frequency of the lock range of the PLL from becoming lower than 20 KHz, thereby eliminating the deleterious effect of the harmonic components of the direct wave.

In addition, the lock range is controlled to prevent abnormal noises, such as a jarring noise, from occurring when the level of the reproduced angle-modulated wave is decreased because of wear or damage of the sound grooves of a record disc. The disclosed system is intended to restrict the lower limit of the lock range by the use of a limiter. The lock range, corresponding to a small decrease in the reproducing level relative to the normal level, is not very much narrowed. However the harmonics of the direct wave become predominant in the frequency band above 20 KHz. Further the lower limit of the lock range extends to the vicinity of 20 KHz even for a relatively small input level. If the level of the angle-modulated wave component decreases slightly, there is a problem of erroneous locking.

The present invention contemplates a further improvement in the above-mentioned system. In greater detail, the erroneous locking responsive to the harmonics of the direct wave signal is eliminated by setting a narrow overall lock range, by decreasing the overall loop gain of the PLL. Further, there is a compensation for the decrease in the level of the demodulated signal in the highfrequency range due to the reduction of the PLL loop gain.

SUMMARY OF THE INVENTION

Accordingly, a general object of the present invention is to provide a novel and useful demodulation system capable of demodulation an angle-modulated wave in such a manner that no deleterious effect due to the harmonic components of a direct wave signal.

Another object of this invention is to provide a system capable of demodulating a picked up angle-modulated wave signal superimposed upon a direct wave signal. Here, an object is to avoid the possibility of abnormal noises by setting a comparatively narrow PLL lock range and thereby, preventing the PLL from being erroneously locked responsive to the harmonic components of a direct-wave signal among the signals picked up from a multi-channel record disc.

Still another object of this invention is to provide a system capable of demodulating an angle-modulated wave in such a manner that abnormal noises caused by the harmonic components of a direct wave signal which become predominant can be prevented, especially during the earlier stage of use of a multi-channel record disc. To this end, the loop gain of the PLL is reduced and its lock range is set small enough so as to fall within the frequency band of the angle-modulated wave.

A further object of this invention is to provide a demodulation system designed to obtain high-fidelity demodulated signals with a flat frequency response up to a high-frequency range. The system compensates for the high frequency range characteristic of the demodulated signal, notwithstanding that the PLL loop gain is small and the lock range is narrow.

Other objects and further features of the present invention will become evident from the following detailed description when read in conjunction with the accompanying drawings.

DETAILED DESCRIPTION

Figure 1:
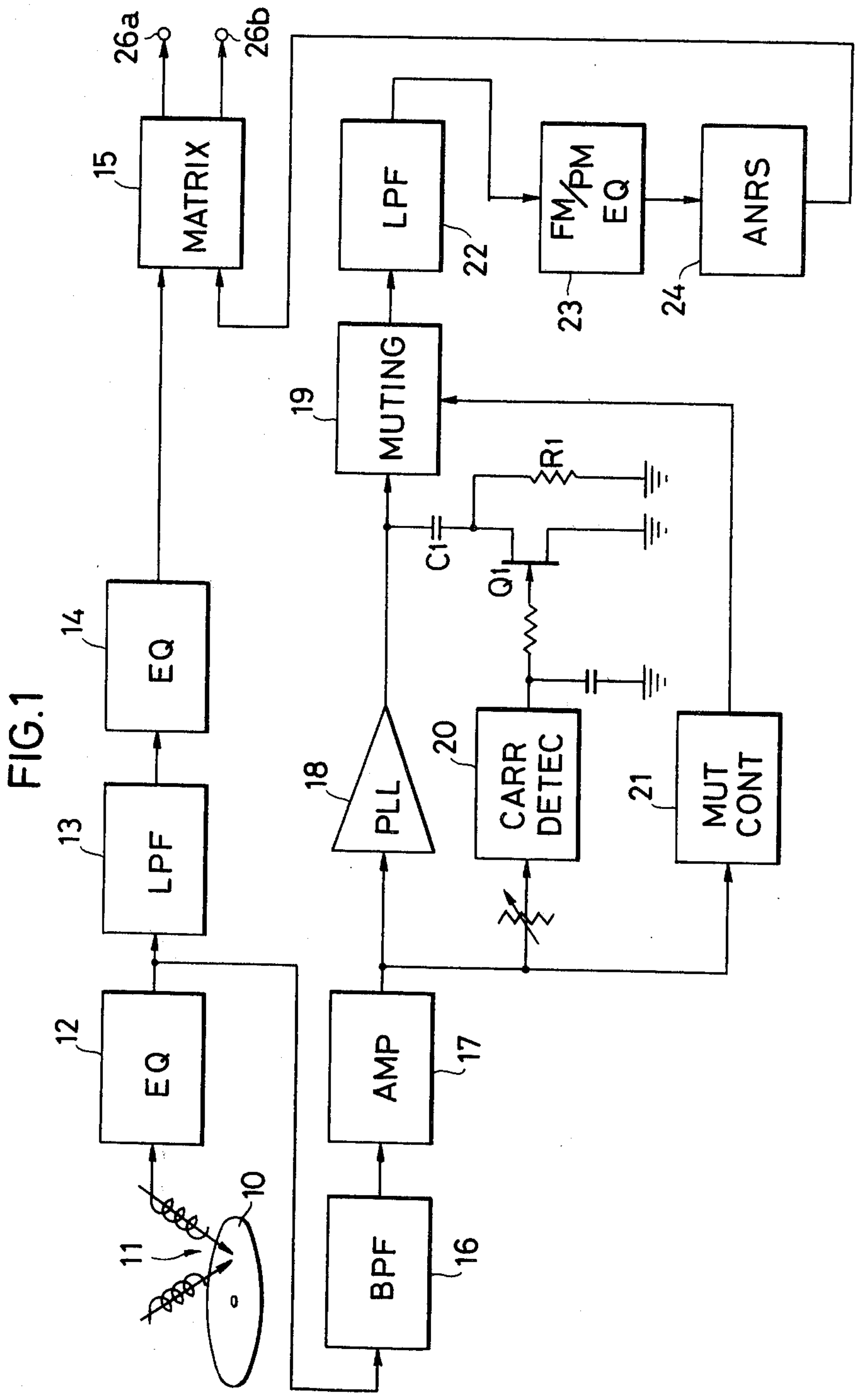
FIG. 1 is a schematic block diagram of a demodulation system according to an embodiment of this invention.

Referring now to FIG. 1, it will be seen that a multiplex signal of a direct-wave sum signal and an angle-modulated difference signal of each pair of two channels is recorded on each side wall of the sound groove of a four-channel record disc 10. Thus, the signals for a total of four channels are recorded on two sidewalls. A multiplex of the direct-wave sum signal and the angle-modulated wave difference signal for two-channel signals are reproduced from the left groove wall. The signals picked up from the grooves of the disc 10 by a pickup cartridge 11 are fed to an equalizer 12, with a RIAA (Recording Industries Association of America) turnover characteristic for equalization.

The reproduced signal is fed to a low-pass filter 13 for elimination of the angle-modulated wave component and for deriving the direct-wave sum signal component only. The direct-wave sum signal is fed to a matrix circuit 15, via an equalizer 14 having the RIAA roll-off characteristic.

The output of the equalizer 12 is fed partly to a band-pass filter 16 (or high-pass filter) with a passband in the approximate range of from 20 KHz to 45 KHz. An angle-modulated-wave difference signal is derived from this filter. The angle-modulated-wave difference signal is fed to PLL circuit 18 containing a phase comparator, a voltage-controlled oscillator, etc. The signal circuit extends via an amplifier 17 to undergo demodulation. Simultaneously, the angle-modulated-wave signal is fed both to a carrier-level detector 20 and to a muting control circuit 21. As described hereinafter, the carrier-level detector 20 is used for detecting a carrier level, controlling the loop gain of the PLL circuit 18, and carrying out a control of the lock range of the PLL. The muting control circuit 21 is for detecting whether or not an angle-modulated wave component is present and for thereby controlling a muting circuit 19.

The demodulated output from the PLL circuit 18 passes through the muting circuit 19. The unwanted components contained in the output are eliminated by a low-pass filter 22. The output from the low-pass filter 22 is fed to the matrix circuit 15 via (in succession) an FM/PM equalizer 23 and an automatic noise reduction system (ANRS) circuit 24 which presents a characteristic that compensates for the characteristic of a compressor in the recording system.

In the matrix circuit 15, the direct-wave sum signal from the equalizer 14 and the demodulated difference signal from the ANRS circuit 24 are matrixed. From output terminals **26*a* and 26*b*** are derived, for instance, the left front (the first channel) and the left rear (the second channel) signals, respectively.

FIG. 1 shows only the circuit system for the first and second channel signals (the left channel system for the grooves of the disc 10). A duplicate (which is exactly the same circuit system) is provided for the right front (the third) and the right rear (the fourth) channel. The detailed illustration and description of this duplicate system are omitted herein.

Figures 2A, 2B:
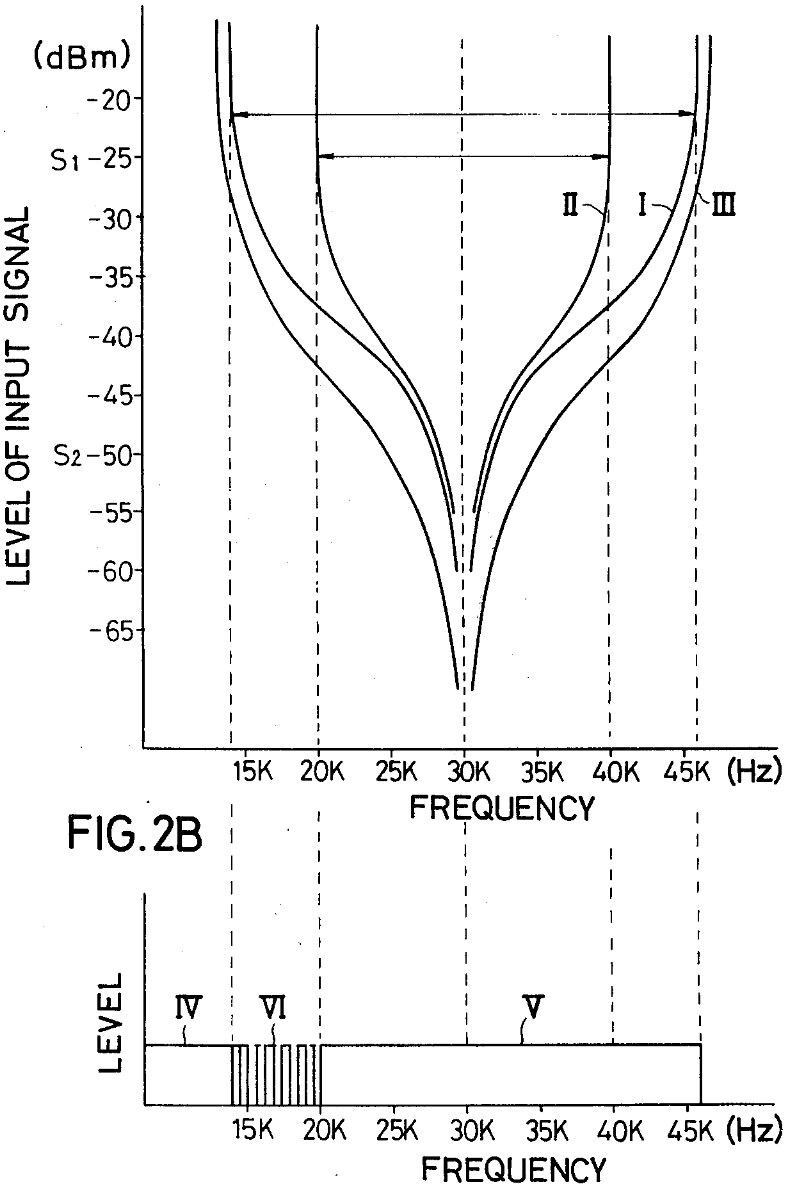
FIGS. 2A and 2B are graphs respectively indicating the PLL lock range for a demodulation system, according to this invention and a frequency spectrum of a picked up signal.

Conventional integrated PLL circuits have had an alternating-current lock range of a maximum bandwidth ranging from 30 KHz ± 15 KHz to 30 KHz ± 18 KHz, as indicated by a curve I in FIG. 2A.

As shown in FIG. 2B, the signal picked up from the record disc 10 is a multiplexed signal of the direct-wave sum signal IV approximately ranging from 20 KHz to 45 KHz and the angle-modulated-wave difference signal V ranging approximately between 20 KHz and 45 KHz. Further the harmonic components VI exist in the range of from 15 KHz to 20 KHz.

The harmonic components are not eliminated by the band-pass filter 16. Where the level of the direct-wave component is high, or the high frequency components are predominant in the direct-wave, these harmonic components may at times become greater than the angle-modulated wave component.

Therefore, if the PLL has a lock range as shown by the curve I, the PLL can be erroneously locked to the harmonic components VI in the range of from 15 KHz to 20 KHz. The occurrence of abnormal noises in this case is inevitable. The noises occur conspicuously when a new record disc is first used and while the reproduction level is set high, as shown by level S1.

In the system of this invention, an AC limitation is imposed on the loop gain of the PLL circuit even in normal operation, with the lock range set narrower as shown by the curve II in FIG. 2A. In the illustrated embodiment, a maximum width of 30 KHz ± 10 KHz is taken for the lock range.

It will be understood that the maximum lock range width of the PLL circuit of the system, according to this invention, is set between 30 KHz ± 5 KHz and 30 KHz ± 10 KHz. Incidentally, the curve III in FIG. 2A indicates the direct-current lock range.

Provided that the lock range width is set as shown by the curve II, the PLL circuit 18 can never be erroneously locked to the harmonic components VI, if the reproduction level is as high as that level which is shown at S1.

A description will now be given of concrete means for obtaining the lock range characteristic shown by the curve II. If the level of the angle-modulated wave fed to the carrier-level detector 20 is decreased (for example, there are scars or dusts in the sound grooves of the record disc) to the level S2 shown in FIG. 2A, the detector 20 detects a decreased level and produces an output signal. The output signal is applied on the gate of the field-effect transistor (FET) Q1. The resistance value of the FET Q1 decreases responsive to the increasing voltage applied on its gate and the loop gain of the PLL circuit 18 becomes smaller, accordingly. Therefore, where the carrier level decreases greatly, the AC lock range is as controlled as to become narrower, thereby preventing the occurrence of noises usually accompanied by a rapid decrease in the carrier level. The loop gain control circuit comprising FET Q1, resistor R1, and capacitor C1 may be connected into a loop in the PLL circuit 18, whereby the same loop gain control effect is attained.

It is noted that a loop-gain limiting resistor R1 is connected to the output side of the PLL circuit 18, the connection extending through the capacitor C1 in parallel with the lock range controlling FET Q1. This resistor R1 has a comparatively small resistance value so that the AC lock range of the PLL circuit 18 may become as shown by the curve II in FIG. 2A, that is, the AC loop gain of the PLL circuit may not exceed a predetermined value.

If the PLL circuit is in the form of an integrated circuit, the resistance value of the resistor R1 should be approximately 3.9 KΩ and 3.3 KΩ for the maximum lock range widths of 30 KHz ± 10 KHz and 30 KHz ± 8 KHz, respectively.

Incidentally, in the previously proposed circuits, the resistor R1 was connected in parallel with the FET (or an ordinary transistor). This resistor was intended to discharge the capacitor C1. Since there was no idea of obtaining the lock range curve II by reducing the loop gain at that time, the resistance of the resistor R1 was set to an extremely high value, or 100 KΩ. For this reason, the loop gain was relatively large.

As another means for obtaining the lock range shown by the curve II, an AGC circuit may be provided in front of the PLL circuit 18, without resorting to the selection of the resistance value of the resistor R1, so that the gain may be suitably controlled.

The possibility of erroneous locking to the harmonic components VI and the resultant occurrence of abnormal noises, as mentioned previously, can be positively prevented by suitably selecting the resistance value of the resistor R1. This resistance value reduced the loop gain of the PLL circuit 18 to obtain the lock range characteristic, as shown by the curve II.

Figures 3, 4A, 4B, 4C:
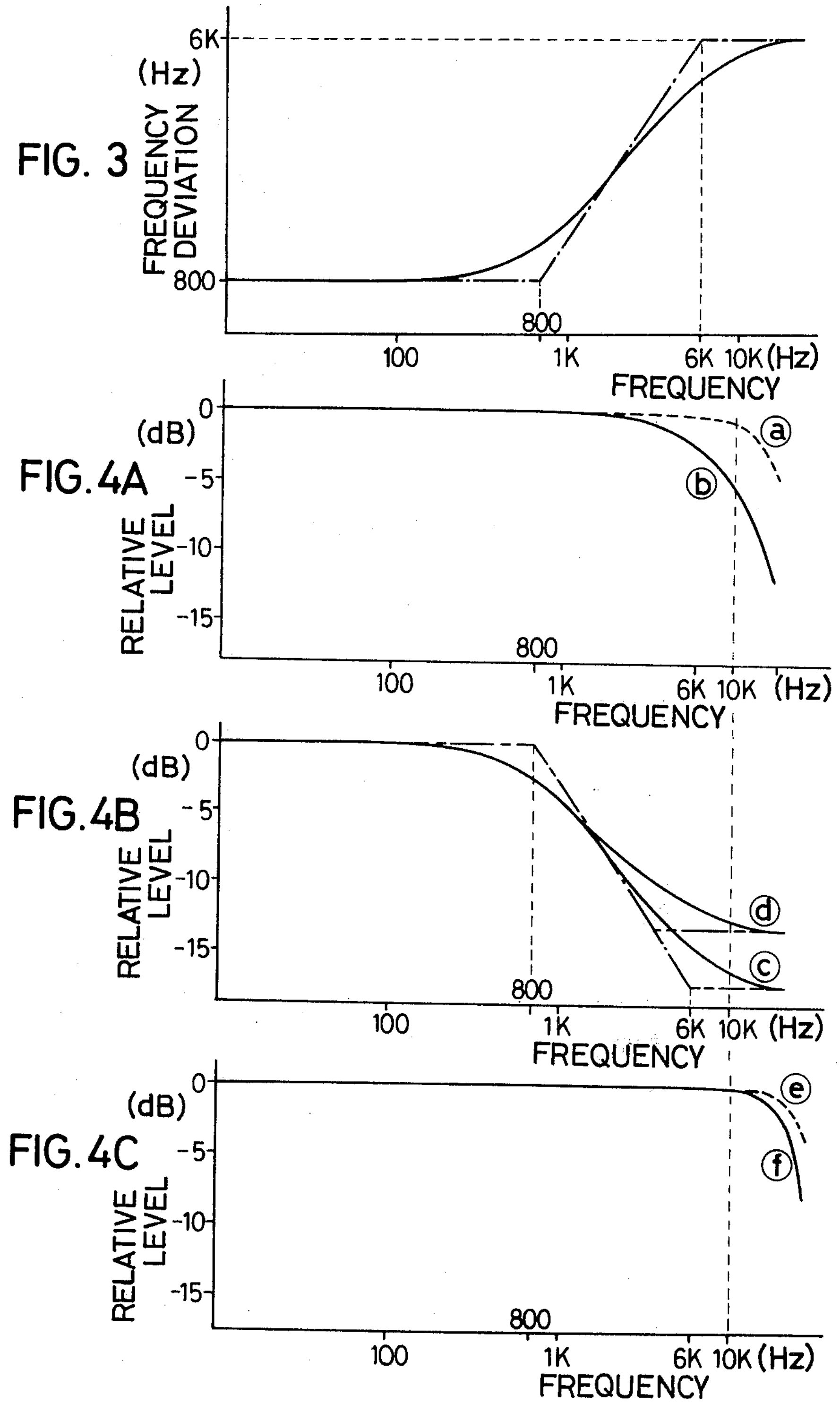
FIG. 3 is a graph showing a characteristic curve of an FM/PM equalizer used in the recording system.
FIGS. 4A, 4B, and 4C are graphs respectively indicating a frequency characteristic of a demodulated signal of the PLL in the demodulation system according to this invention, a characteristic curve of the FM/PM equalizer used in the reproduction system, and an overall frequency characteristic of a combined PLL and FM/PM reproduction equalizer.

The curve ⓑ of FIG. 4*a* shows the frequency characteristic of the difference signal demodulated by the PLL circuit 18, with the reduced loop gain, as mentioned above. in FIG. 4A.

Provided that the PLL circuit is set to have the loop gain with the lock range shown by the curve I, the frequency characteristic of the demodulated signal becomes as shown by the curve ⓐ. If the PLL circuit is set to a reduced loop gain value to provide the lock range, as shown by the curve II, the frequency characteristic of the demodulated signal indicates the level attenuation in the higher frequency range, as shown by the curve ⓑ. Accordingly, high-fidelity reproduction cannot be expected under these conditions.

According to the demodulation system of this invention, the characteristic of the FM/PM equalizer 23 is set, as will be described, so that high-fidelity reproduction can take place.

With discrete multi-channel record discs, frequency modulation (FM) is used for frequencies lower than 800 Hz in the difference signal. Phase modulation (PM) is used for frequencies of from 800 Hz to 6 KHz. Frequency modulation (FM) is used for frequencies above 6 KHz. In order to achieve both FM and PM modulation with a single frequency modulator, in response to the frequency bands of the modulated signals as such, an FM/PM equalizer with a characteristic as shown in FIG. 3 is provided in the front stage of the modulator in the recording system. The dot-and-dash line in the figure represents an ideal equalizing characteristic, while the full line curve represents an actual equalizing characteristic.

For this reason, a need arises for using an equalizer having an equalizing characteristic as shown by the curve C in FIG. 4B which is complementary to the characteristic shown in FIG. 3. This is the reason why the FM/PM equalizer 23 is provided.

The FM/PM equalizer 23 of the present system, however, is designed to have an equalizing characteristic, as shown by curve ⓓ. At frequencies in excess of about 1 KHz, the level gradually increases, as compared with curve ⓒ, to become higher than the curve ⓒ by about 4 dB – 6 dB at frequencies above 6 KHz.

Therefore, the overall frequency characteristic for the combined PLL circuit 18 and FM/PM equalizer 23 becomes as shown by the curve ⓕ in FIG. 4C. The frequency characteristic of an output signal from the equalizer 23 becomes as shown by the curve ⓕ. Consequently, as will be evident from the figure, a characteristic closely resembling the overall frequency characteristic ⓔ will be obtained if the loop gain of the PLL circuit 18 is large (that is, the lock range becomes as shown by the curve I in FIG. 2A) and if the characteristic of the equalizer 23 is as shown by the curve ⓒ in FIG. 4B. This characteristic indicates only a nominal decrease in level in the higher frequency range, resulting in the assurance of a high-fidelity reproduction.

Figure 5:
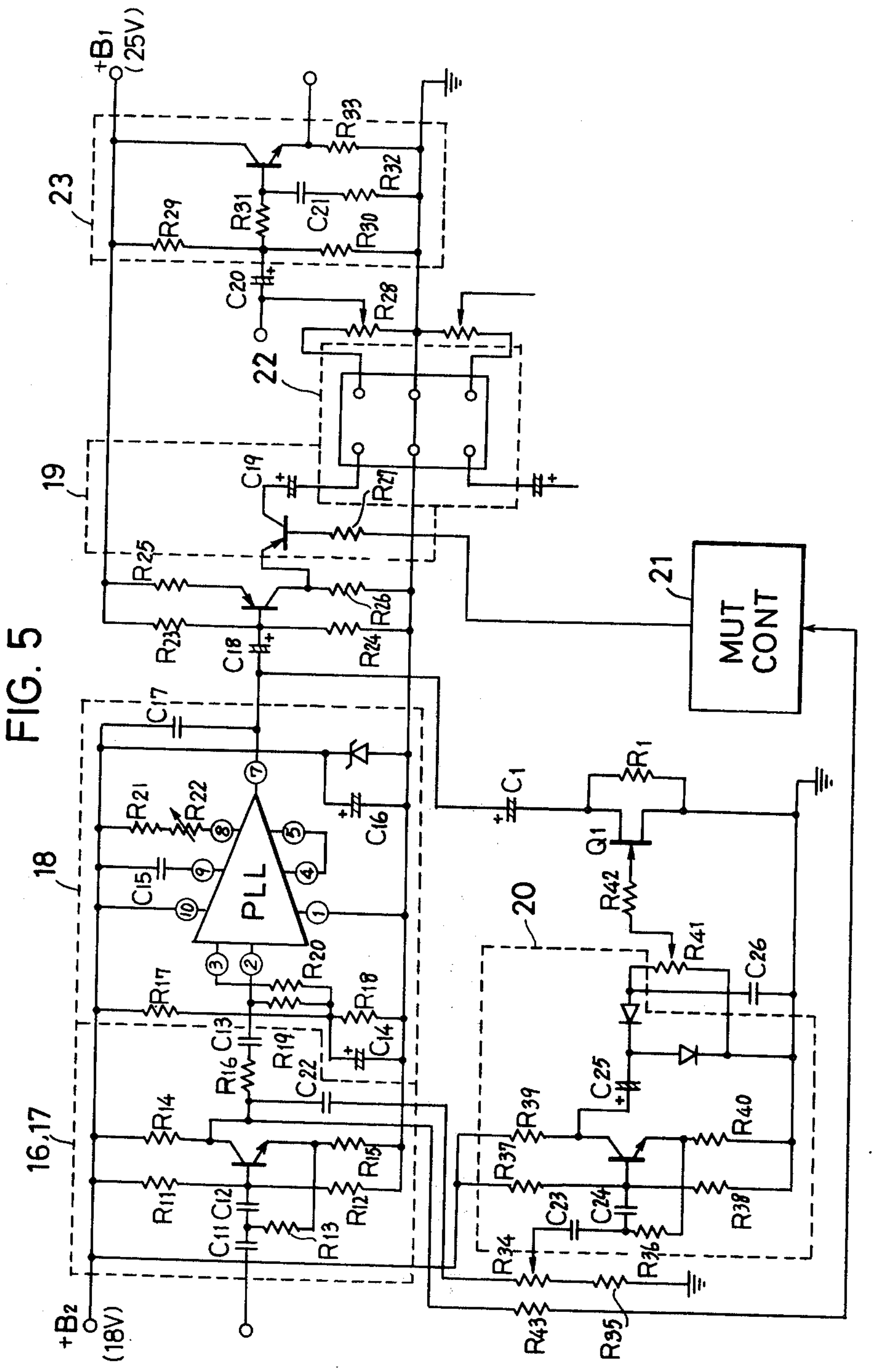
FIG. 5 is a circuit diagram of an embodiment of an actual circuit which constitutes an essential part of the system shown by schematic block diagram in FIG. 1.

FIG. 5 shows an embodiment of a specific electrical circuit for the essential part of the system shown by the block diagram in FIG. 1, in which the same reference numerals as used in FIG. 1 designate like components. FIG. 5 indicates various circuits and components such as the band-pass filter 16, amplifier 17, PLL circuit 18, muting circuit 19, carrier-level detector 20, muting control circuit 21, low-pass filter 22, FM/PM equalizer 23, and other circuits associated with these circuits.

In the circuit of this embodiment, the resistance value of the resistor R1 is selected at 3.3 KΩ. Hence, the maximum lock range of the PLL circuit 18 is 30 KHz ± 8 KHz.

The FM/PM equalizer 23 has an attenuation type circuit structure. With conventional equalizers, the resistance value of resistor R32 in the equalizer 23 is in the order of 4.7 KΩ. The characteristic curve is as shown by the curve ⓒ. In the present system, however, the resistor R32 is selected at 10 KΩ. The characteristic curve is as shown by the curve ⓓ. It is seen that the curve ⓓ is a 6 dB improvement over the curve ⓒ, in the higher frequency range.

The constants the respective circuit elements of the circuit shown in FIG. 5 are described as follows.

Resistors

| | | | | | | | |
|---|---|---|---|---|---|---|---|
| R1 | 3.3 | KΩ | | | | | |
| R11 | 330 | KΩ | | R12 | 22 | KΩ | |
| R13 | 3.9 | KΩ | | R14 | 4.7 | KΩ | |
| R15 | 180 | Ω | | R16 | 15 | KΩ | |
| R17 | 10 | KΩ | | R18 | 10 | KΩ | |
| R19 | 560 | Ω | | R20 | 560 | Ω | |
| R21 | 2.7 | KΩ | | R22 | 2.2 | KΩ | (VR) |
| R23 | 33 | KΩ | | R24 | 470 | KΩ | |
| R25 | 220 | Ω | | R26 | 4.7 | KΩ | |
| R27 | 10 | KΩ | | R28 | 5 | KΩ | (VR) |
| R29 | 270 | KΩ | | R30 | 56 | KΩ | |
| R31 | 47 | KΩ | | R32 | 10 | KΩ | |
| R33 | 4.7 | KΩ | | R34 | 50 | KΩ | (VR) |
| R35 | 3.9 | KΩ | | R36 | 6.8 | KΩ | |
| | 330 | KΩ | | R38 | 18 | KΩ | |
| R37 | | | | | | | |
| R39 | 8.2 | KΩ | | R40 | 150 | Ω | |
| R41 | 10 | KΩ | (VR) | R42 | 56 | KΩ | |

Capacitors

| | | | | | |
|---|---|---|---|---|---|
| C1 | 10 | μF | | | |
| C11 | 0.001 | μF | C12 | 470 | PF |
| C13 | 0.0022 | μF | C14 | 1 | μF |
| C15 | 0.0027 | μF | C16 | 10 | μF |
| C17 | 0.0027 | μF | C18 | 1 | μF |
| C19 | 2 | μF | C20 | 4.7 | μF |
| C21 | 0.0039 | μF | C22 | 0.015 | μF |
| C23 | 0.0012 | μF | C24 | 0.001 | μF |
| C25 | 0.47 | μF | C26 | 0.0033 | μF |

Although fixed-resistance-value resistors are used as resistors R1 and R32, in the above described embodiment, variable resistors may be used to vary the resistance values.

An alternate type equalizer is used as the FM/PM equalizer 23. However, the present invention should not be restricted to this circuit structure. Alternatively, the equalizer 23 may be composed, for instance, of a combination of an amplifier and a negative feedback circuit.

Further, it is by no means necessary to provide a circuit exclusively used as the FM/PM equalizer 23. For instance, the characteristic serving as the equalizing action may be incorporated in the low-pass filter 22 or the ANRS circuit 24. In short, all that is needed is to install a circuit capable of providing the equalizing characteristic (provided the circuit is substantially capable of such action) shown by the curve ⓐ between the output of the PLL circuit 18 and the input of the matrix circuit 15.

Further, this invention is not limited to these embodiments, but variations and modifications may be made without departing from the scope and spirit of the invention. Therefore, the appended claims are to be construed to cover all equivalent structures.

What is claimed is:

1. A demodulation system comprising:

a phase-locked loop circuit means for demodulating an angle-modulated wave signal picked up from a multi-channel record disc on which a direct-wave signal and the angle-modulated wave signal are superimposed and recorded;

means responsive to said phase-locked loop circuit for setting the loop gain small so that the maximum lock range width of said phase-locked loop circuit falls within the frequency band of said angle-modulated wave signals; and equalizing means responsive to signals demodulated by said phase-locked loop circuit for reinforcing and compensating for the higher frequency range characteristic of the frequency characteristic of the signals demodulated by said phase-locked loop circuit.

2. A demodulation system according to claim 1, wherein the signals picked up from said multi-channel record disc comprise a direct-wave signal having frequencies ranging from 0 to 15 KHz, and an angle-modulated wave signal having frequencies ranging from 20 KHz to 45 KHz, and the harmonic components of the direct-wave signal existing in at least a frequency band extending from 15 KHz to 20 KHz, and means for setting the loop gain of said phase-locked loop so that the maximum lock range width of said phase-locked loop circuit is from 30 KHz ± 5 KHz through 30 KHz ± 10 KHz.

3. A demodulation system according to claim 1, wherein said loop gain setting means comprises:

means for detecting the level of an angle-modulated wave fed into the input of said phase-locked loop circuit and for producing an output signal when said level is less than a predetermined level;

a variable resistance element means having a resistance value which can be varied responsive to the output signal from said level detecting means; and means comprising a resistor connected in parallel with said variable resistance element, wherein the resistance value of said resistor has a value for providing a loop gain value such that the lock range width of said phase-locked loop circuit falls within the bandwidth of said angle-modulated wave signal under conditions in which said variable resistance element is not variably controlled to reduce its resistance value.

4. A demodulation system according to claim 3, wherein said resistor has a resistance value in the order of from 3 KΩ through 5 KΩ.

5. A demodulation system according to claim 1, wherein said equalizing means has a FM/PM equalizing characteristic approximately complementary with the FM/PM equalizing characteristic used in the recording system of said multi-channel record disc and means for setting the level in the higher frequency range higher than the level of the complementary characteristic.

6. A demodulation system according to claim 5, wherein the higher frequency range characteristic portion of said equalizing means is set at a level which is higher than the level of said complementary characteristic by an order of from 4 dB through 6 dB.

7. A demodulation system comprising:

a phase-locked loop circuit for demodulating an angle-modulated wave signal picked up from a multichannel record disc;

control means, connected to the phase-locked loop circuit, for controlling and lowering the AC loop gain of the phase-locked loop circuit without controlling a DC loop gain thereof;

setting means connected to the control means for setting the AC loop gain at a level which is low enough so that the frequency range representing the maximum AC lock range width of the phase-locked loop circuit is narrower than the frequency range of the angle-modulated wave signal at the time when the control means is in a non-controlling state, whereby said phase-locked loop circuit does not lock responsive to frequency components which are lower than the minimum frequency of the frequency range of the angle-modulated wave signal and demodulates the angle-modulated wave signal with only a little loss in high frequency range of the frequency response characteristic; and equalizing means responsive to the demodulated signals from the phase-locked loop circuit for reinforcing the level of the demodulated signals in high frequency range and for compensating for said loss.

* * * * *